(No Model.)
J. H. BRADY.
WATER FILTERING AND COOLING SYSTEM.
No. 581,330. Patented Apr. 27, 1897.
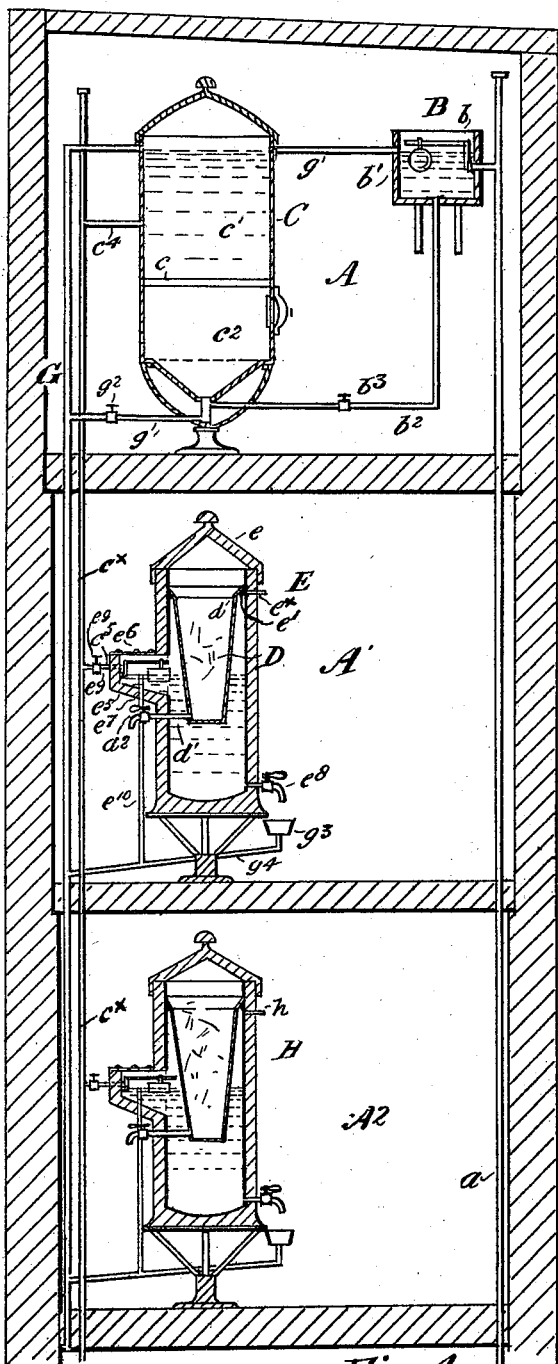
WITNESSES:
INVENTOR
Joseph H. Brady
BY Rich'd H. Manning
ATTORNEY

UNITED STATES PATENT OFFICE.

JOSEPH H. BRADY, OF KANSAS CITY, MISSOURI.

WATER FILTERING AND COOLING SYSTEM.

SPECIFICATION forming part of Letters Patent No. 581,330, dated April 27, 1897.

Application filed August 22, 1896. Serial No. 603,653½. (No model.)

*To all whom it may concern:*

Be it known that I, JOSEPH H. BRADY, a citizen of the United States, residing at Kansas City, in the county of Jackson and State of Missouri, have invented a new and Improved Water Filtering and Cooling System; and I do hereby declare that the following is a full, clear, and exact description of the invention, reference being had to the accompanying drawings, forming a part of this specification.

My invention has for its object the automatic regulation of the supply of filtered water in proportion to the amount drawn from the cooler for use, and also the drenching, when necessary, of the water-filter.

The invention consists in the apparatus and system pointed out in the claim.

Referring to the drawings, Figure 1 is a sectional elevation of a building, showing the separate floors one above another and the separate apartments, the main water-service or supply pipe extending from the street and through each floor to the upper apartment, and my improved water filtering and cooling system applied to the water-distribution pipes in the separate apartments, the respective filtering and supply tanks and the coolers being in vertical section. Fig. 2 is a detail view of separate apartments, showing in perspective the water-filtering tank and supply-tank in the upper apartment and the water-cooling tank in the apartment beneath. Fig. 3 is a detail view of a portion of one of the cooling-tanks in perspective, showing the lateral extension for the float-valve.

Similar letters of reference indicate corresponding parts in all the figures.

In carrying out the details of my invention A A' A² represent separate apartments in a building supplied with the ordinary water-service pipe $a$, extending from the street upwardly through the apartment A², thence through apartment A' next above, and thence into the upper apartment A next above apartment A' and conveying unfiltered water. In the upper apartment A, at a suitable height from the floor, is a stationary open tank B. The upper end of the pipe A is extended through the side of the tank B at a point a short distance below the upper edge of said tank and in said pipe. Within the tank is a valve $b$, with which valve is connected a valve-rod and an adjustable float $b'$, which float at the proper height of water in tank B cuts off the supply of water from pipe A.

In the apartment A is a vertical cylindrical water-filtering tank C of a convenient size to filter a large amount of water. In the tank C, at a suitable height from the bottom of said tank, is a filtering-diaphragm $c$, of terra-cotta, stone, or other material suitable to the purpose, above which diaphragm is a chamber $c'$ for the filtered water, and beneath said diaphragm is a chamber $c^2$, containing unfiltered water.

A pipe $b^2$ is connected with the bottom of tank B at one end, and with the under side portion of the water-filter C and the chamber $c^2$ at the other end, and in said pipe is a valve $b^3$. With the upper side portion of the filter C and chamber $c'$ one end of a water-distributing pipe $c^4$ is connected with a pipe $c^\times$, the other end of which pipe extends downwardly through the floor of apartment A, and also through apartments A' A², and conducts filtered water to the cooling-receptacles in each apartment, as hereinafter described.

In the apartment A' is a water-cooling receptacle E. Said receptacle consists of a vertical cylindrical tank having a removable top or cover $e$. In the upper part of the receptacle E is a fixed annular flange $e'$. Within the receptacle or tank is an ice-holding receptacle D, made of stone or potters' clay, the upper end of which is provided with an outwardly-flaring flange $d$, which rests upon the annular flange $e'$. The lower end of the receiver is smaller in diameter than the upper end and extends downwardly to a position below a line equidistant from both ends of said tank.

To the lower end of the ice-receptacle D is connected one end of a discharge-pipe $d'$, the other end of which pipe extends through the side of the receptacle or tank E and is provided with a valve $d^2$.

Upon the outer side portion of the receptacle E, at a point a considerable distance above the level of the bottom of the ice-holding receptacle D, is a valve-box $e^5$, which consists of a lateral extension of the sides of the tank, so as to form a box of proper dimensions, the bottom of the box inclining downwardly toward the tank. Upon the top of box $e^5$ is a detachable cover $e^6$, secured by bolts to the box. With the outer end of this valve-box $e^5$ is connected one end of a branch pipe $c^5$ of the pipe $c^\times$, extending from the filtering-tank A, the other end of which pipe extends a short distance within said box $e^5$, and with said portion of said pipe is connected a float-valve $e^7$, which regulates the supply of filtered water to the cooling-receptacle E. In the outer side and lower end portion of the tank E is a faucet $e^8$, from which the filtered water is drawn. In the branch pipe $c^5$ is a valve $c^9$.

In the upper part of the tank E is an air-escape opening $e^\times$, and in tank H is an air-escape opening $h$.

In the apartment A is a waste-pipe G, which extends downwardly through the floor of said apartment, and through the floor of the respective apartments $A'$ $A^2$, and through the wall of the building to the ground or any safe receptacle uncontaminated with gases.

With the upper end of the waste-pipe G is connected one end of an overflow-pipe $g$, the other end of which pipe is connected with the open water-tank B at a point a short distance below the upper edges of said tank. With the bottom of the water-filter C is connected one end of a discharge-pipe $g'$, the other end of which pipe is connected with the waste-pipe G. In pipe $g'$ is a valve $g^2$. In the apartment $A'$ and beneath the faucet $e^8$ is a drippan $g^3$, with which pan is connected one end of a pipe $g^4$, the other end of which pipe is inclined downwardly and connected with the waste-pipe G in said apartment. With the side of box $e^5$ is connected one end of an overflow-pipe $e^{10}$, the other end being connected with pipe $g^4$.

In the apartment $A^2$ is a cooling-tank H, which is precisely the same in construction and arrangement as the cooling-tank E and is connected with the supply-pipe $c^4$ from the filtering-tank C in the same manner, it being observed that the pipe conducting filtered water is readily carried into all apartments of the building where the water is required, and under the gravity pressure of the water from the tank B the supply is proportionate to the demand. The receptacle D in cooler E is first filled with ice or other refrigerant. The unfiltered water which passes through pipe $a$ in my improved system enters tank B, and its flow is cut off at the proper height by the float-valve $b$. The water in tank B flows through pipe $b^2$ into the filter C and is filtered in passing upward through the filtering-diaphragm $c$. The filtered water in chamber $c'$ of filter C passes through the pipe $c^4$ to the cooling-tank E, and its flow is cut off as soon as the water attains a proper height in said tank by the float-valve.

Should the valve fail to cut off the water, it passes through the overflow-pipe $e^{10}$ into the waste-pipe $g^4$. The filtered water in the respective tanks E and H circulates around the ice-receptacle D, and its temperature is reduced, the air in the inflow of the filtered water passing out of the vents $e$ and $h$, which are above the level of the water in each receptacle. The melted water from the ice-receptacle is discharged through pipe $d'$.

When the water is employed for drinking purposes, which is obtained through faucet $e^8$, the amount withdrawn is replenished in the cooling-tanks E and H automatically, an equivalent supply of filtered water taking its place. The quantity of cold filtered water in the tanks E H being in close contact with the refrigerant, a quantity of cold filtered water may be obtained in the tanks E H in excess of that ordinarily used for drinking purposes, the adjustment of the float-valve in the tank E permitting a supply of the filtered water, as much as withdrawn.

The improved filtering and cooling system may be applied to school and dwelling houses and public buildings of all kinds with economy in the use of refrigerants and without an unnecessary waste of water and with a saving in the labor ordinarily required to fill water-coolers.

The distribution of filtered water is at all times under control, and while one cooling-tank in any one apartment may be cut out of the pipe connection with another, as, for instance, by closing valve $e^9$ in the pipe $c^4$, the supply of filtered water is evenly distributed to the cooling-tanks in the other apartments.

In drenching the filtering-tank the valve $g^2$ in the pipe $g'$ is opened and the supply of filtered water is cut off from the water-cooler in the apartment beneath the filter, and the float-valve in the tank B admits a sufficient amount of unfiltered water into the lower chamber of the filtering-tank in proportion to the escape of the water through the valve $g^2$ to drench the tank and remove the impurities which settle in the bottom of the tank.

Having fully described my invention, what I now claim as new, and desire to secure by Letters Patent, is—

In a water-supply system the combination of a water-supply tank, a filtering-tank, and one or more water-cooling tanks at separate water-level elevations, a main supply or water-service pipe connected with the source of supply of water, and also with the said supply-tank, an automatic water cut-off or valve in said tank, a water-conductor connected with the said supply-tank and also with the bottom portion of said filtering-tank, and a conductor for the filtered water connected with the filtering-tank and extending downwardly in the direction of the water-cooling tanks, and a branch pipe connected with said conductor of filtered water and each one of the water-cooling tanks, an automatic water-supply regulator in each water-cooling tank and a distributing-pipe to said tank, a waste-pipe connected with the sewer extending upwardly in the direction of the water-filtering tank, and a discharge-pipe connected with
5 the bottom of the said filtering-tank and also with the said waste-pipe, a valve in said discharge-pipe and an overflow-pipe connected with each one of the cooling-tanks, and also with the said waste-pipe to the sewer, as and for the purpose set forth.

JOSEPH H. BRADY.

Witnesses:
  H. R. TOMLINSON,
  A. L. GREER.